Nov. 2, 1954     K. S. GAMET ET AL     2,693,394
WHEEL COVER
Filed Aug. 9, 1952
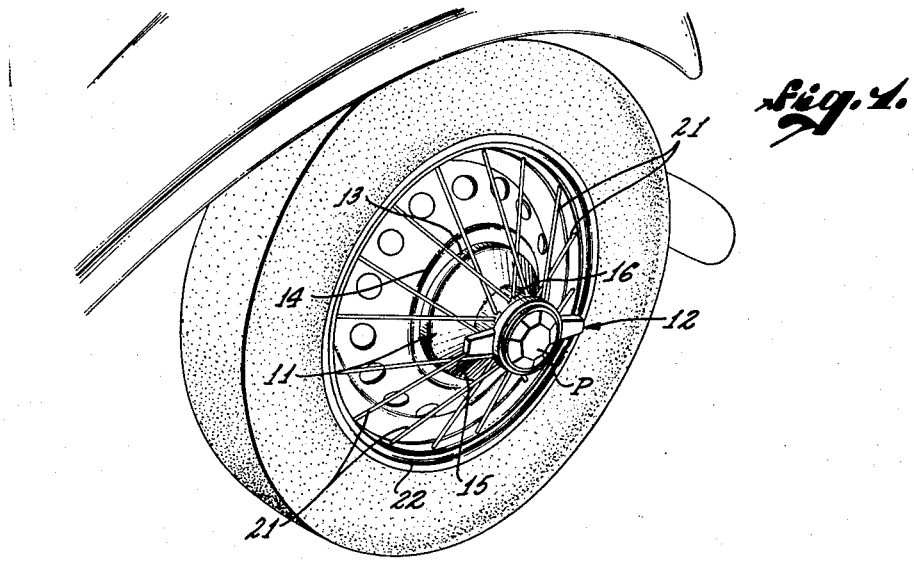
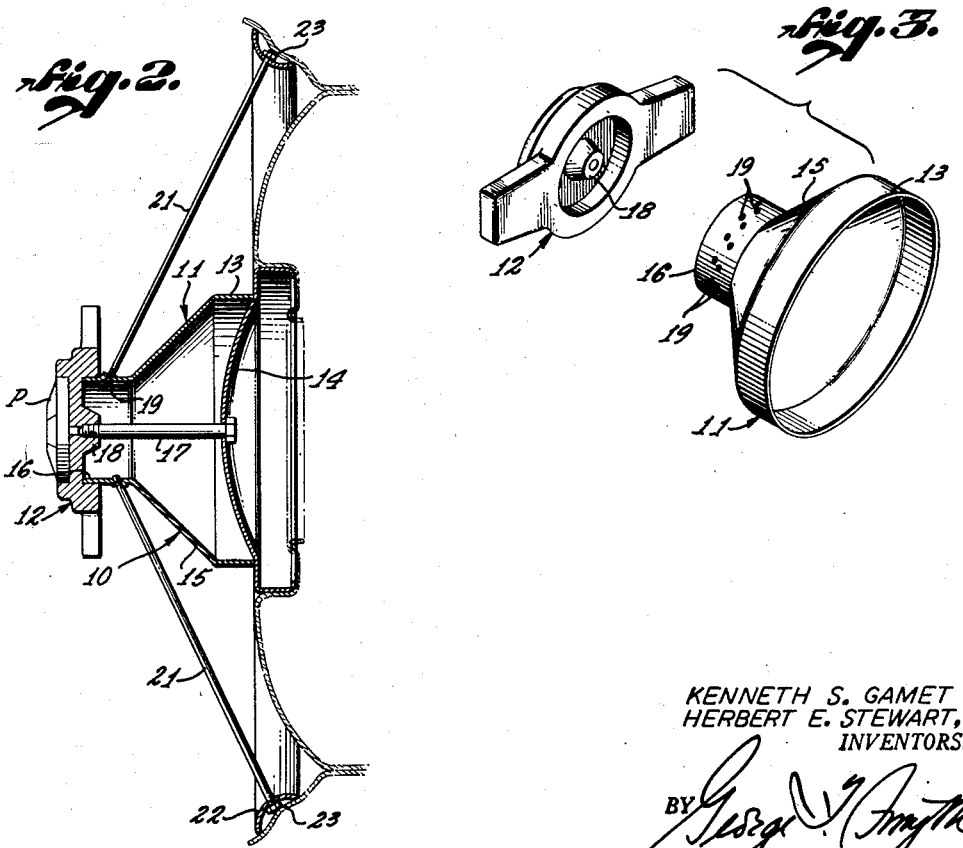
KENNETH S. GAMET &
HERBERT E. STEWART,
INVENTORS.
ATTORNEY.

United States Patent Office 2,693,394
Patented Nov. 2, 1954

2,693,394

WHEEL COVER

Kenneth S. Gamet, Los Angeles, and Herbert E. Stewart, Beverly Hills, Calif.

Application August 9, 1952, Serial No. 303,468

6 Claims. (Cl. 301—37)

This invention relates to an ornamental wheel cover for mounting to a vehicle wheel and more particularly to one which, when mounted, simulates a wire spoked "racing wheel" of many so-called sport cars.

The cover of the present invention is one which provides a ready means for ornamenting the wheel of the vehicle and for varying the appearance of the design of the wheel to which it is attached. The cover, after it is attached to the wheel, gives to the existing wheel the appearance of one having the rim mounted by wire spokes such as used in many racing cars. The device is easily mounted to an existing wheel and requires no alteration of the wheel structure.

In the preferred form of the invention the wire spokes interconnect an annular member simulating a rim adapted to be superimposed on the existing rim of the wheel, and a body portion simulating a wheel hub. The body portion mounts a cap having the appearance of the usual wheel cap of a wire wheel and this cap forms a part of the means used to mount the cover to the existing hub cap of the vehicle wheel. The cover is thus mounted to or carried by the hub cap and is removable from the wheel with the cap.

The body portion simulating the wheel hub of the device and which telescopically mounts the wheel cap is actually a spacer element clampingly mounted between the simulated cap and the existing cap of the vehicle wheel. The means used to fix the spacer hub element between the simulated cap and the existing cap of the wheel thus also mounts the cover of the present invention to the existing wheel cap.

In the illustrated embodiment of the invention the spacer element terminates at the outer end thereof in a cylindrical hub-like element to which are fixed the outer ends of the wire spokes. These spokes extend rearwardly and somewhat radially from the hub element to their anchorage to the annular member simulating the rim of the device. The wire spokes are of such a length that, after the cover of the present invention is fixed to the existing wheel cap and the latter is secured to the wheel proper, the annular member or rim element of the cover is held against the existing wheel rim.

The cover of the present invention in position on the vehicle wheel gives to the wheel a simulated appearance of a wire spoked racing wheel without the expense which would be incurred if this type of wheel were substituted for the existing wheel of the vehicle. Furthermore, the cover device of the present invention as it is carried by the existing wheel cap, in no way complicates the removal of the wheel from the axle, for the removal of the existing cap effects removal of the cover.

Other features and advantages of the present invention will be hereinafter apparent from the following description, particularly when taken in connection with the accompanying drawing, in which Figure 1 is a perspective view of a vehicle wheel showing the wheel cover of the present invention in position thereon;

Figure 2 is a sectional view of the wheel cover with the contiguous structure of the existing wheel shown in broken lines;

Figure 3 is an exploded view of the simulated hub cap and wheel hub of the device.

The device of the present invention, referring now to the drawing and more particularly to Figure 2 thereof, comprises a simulated wheel hub 10 including a body portion or spacer hub element 11 and a simulated hub or wheel cap 12. The hub element 11 is formed with an enlarged cylindrical section 13 which is adapted to engage against the existing hub cap 14 of the wheel of the vehicle. The cylindrical section 13 is progressively reduced in cross-sectional area to form a conical section 15 which carries at its outer end a simulated hub section 16 of cylindrical form.

This hub element 16 is telescopically fitted within a bore formed in the rear face of the simulated hub or wheel cap 12 so that the cap assumes the appearance of a wheel cap threadedly mounted to the hub. The cap 12 is held to this hub element 16 by an elongate bolt or stud 17, passed through an opening in the existing hub cap 14, having a threaded portion of its shank engaged in a tapped opening formed in a boss 18 carried by the transverse wall of the bore in which the hub element 16 is telescopically fitted. It will thus be seen that the clamping means formed by the bolt 17 not only clampingly mounts the spacer hub element 11 to the existing hub cap 14, but also secures the hub cap 12 to the hub element 11.

In many installations it is not necessary to form an opening in the existing hub cap 14 for mounting the bolt 17, as many hub caps are formed with an opening for fixing an insignia or maker's name plate to the exterior face of the hub cap. In the illustrated embodiment of the present invention, such an installation is depicted for the opening passing the stud or bolt 17 was originally used to mount an insignia plate to the cap 14. This plate, once removed, can be mounted to the wheel cap 12 of the cover by inserting the mounting means originally passed through the opening in the cap 14 in the bore receiving the threaded end of the bolt 17. The insignia plate is indicated in the drawing by the reference character P and seats in a recess formed in the outer face of the simulated cap 12.

Where the existing hub cap is not formed with an opening for mounting an insignia plate, it is, of course, necessary to drill or otherwise form an opening through the cap to mount the bolt 17. This is not a difficult operation and can be accomplished by means of an ordinary hand drill.

It should be seen that the reception of the cylindrical shell 16 in the bore of the cap 12 tends to center the hub element 11 relative to the cap 14 as the bolt 17 is drawn up to clamp the hub element 11 between the cap 12 and the existing cap 14. This is so for the outer surface of the shell portion 16 is concentric with the cylindrical wall of the bore and as the tapped opening of the cap 12 is also concentric to the wall of the bore, the tension forces produced by the bolt will concentrically mount the cover to the hub cap 14 of the wheel. This centering action is further augmented by the coaction between the inner edge of the hub element 11 and the spherical can or dimple formed in the cap 14.

The hub element 16 is formed with a plurality of tapped openings 19 arranged as shown in Figure 3. It will be seen, referring to this figure, that there are actually two annular series of equally spaced openings 19, with the one series being offset or staggered relative to the other. The tapped openings 19 receive the threaded end portion of the wire spokes 21 of the cover and when first mounted the wire spokes project radially from the hub element 16 and lie in a common plane arranged substantially normal to the longitudinal axis of the hub element 16.

After all of the spokes 21 are mounted to the hub element, the free ends of the spokes are secured to an annular member 22 simulating a rim element by passing the free ends through openings formed about the rim formed by the annular member 22, after which some securing means such as the nuts 23 shown, are mounted to the protruding ends of the spokes to prevent their separation from the rim 22. During the assembly of the spokes 21 with the rim 22, adjacent spokes mounted in the two series of openings 19 are forced rearwardly and also in a diverging attitude so that the spokes in the final assembly are in the relationship shown in Figure 1 of the drawing.

It will be seen that the diverging relationship of the spokes mounted in contiguous openings in the two annular series of openings actually brings about a crossing of the spokes mounted in the one annular series of openings in the hub element 16 with the spokes mounted in the other annular series of openings formed therein. This deforms somewhat, as clearly shown in Figure 2, the wall of the cylindrical hub element 16 of the spacer hub to create the appearance of a standard wire spoked wheel without the necessity of expensive forming operations required in conventional wire spoked wheels.

The spokes 21 are of such a length that the rim 22 when the bolt 17 is drawn up to clamp the body portion or spacer hub 11 against the cap 14, snugly engages the existing rim of the vehicle wheel as clearly shown in Figure 2. The rim 22 is preferably formed concavo-convex in cross-section to permit reception of the nuts 23 between the existing rim of the wheel and the rim 22 of the cover device of the present invention.

It should now be seen that the cover plate is actually mounted to and carried by the existing hub cap 14 of the vehicle wheel to the end that the cover device is removed from the wheel by removal of the existing hub cap from the wheel. Thus the device of the present invention in no way complicates the removal of a wheel from the axle or wheel mounting means of the vehicle for the cover plate can be removed by the same operation which removes the conventional hub cap. The particular method by which the existing hub cap is mounted to the vehicle wheel will vary in wheels of different car manufacturers, but in most instances the hub cap is merely frictionally held in position on the wheel or hub.

The cover device of the present invention, as should now be seen, provides an ornamental and decorative cover which, when mounted to an existing disc type wheel, gives to that wheel the appearance of a racing type wire spoked wheel.

The device once mounted to a vehicle wheel is not likely to become detached therefrom for the natural resiliency of the wall of the existing hub cap is generally sufficient to supply a spring force to the clamping bolt 17 which has the natural tendency of binding the thread of the bolt with the thread of the tapped opening of the boss 18 to prevent accidental rotation of the bolt relative to the threads of the tapped opening in the boss.

Although the now preferred embodiment of the present invention has been shown and described herein, it is to be understood that the invention is not to be limited thereto, for it is susceptible to changes in form and detail within the scope of the appended claims.

We claim:

1. A wheel cover for disposition over an outer side of a wheel of a vehicle, comprising: an annular member simulating a rim of substantially the same diameter as the diameter of the rim of said wheel, said member adapted to be superimposed on said wheel rim; a simulated hub element; a plurality of wire spokes interconnecting said member and element in simulation of a wire wheel; and means for clamping said annular member in a superposed relation to the rim of said wheel and securing said hub element to the existing cap of the hub of said wheel, whereby said cover is held to said wheel to simulate a wire spoked wheel and is removable therefrom with the existing cap of said wheel.

2. A wheel cover for disposition over an outer side of a wheel of a vehicle, comprising: an annular member simulating a wheel rim of substantially the same diameter as the diameter of the rim of said wheel; a simulated hub element; a plurality of wire spokes interconnecting said member and element in simulation of a wire wheel; a simulated hub cap to be mounted to said hub element; and means for clamping said annular member in a superposed relation to the rim of said wheel and securing said simulated hub cap to the existing cap of the hub of said wheel with the simulated hub element therebetween, whereby said cover is held to said wheel to simulate a wire spoked wheel.

3. A wheel cover for disposition over an outer side of a wheel of a vehicle, comprising: an annular member simulating a rim of substantially the same diameter as the diameter of the rim of said wheel and adapted to be superimposed on said wheel rim; a simulated hub element; a plurality of wire spokes interconnecting said member and element in simulation of a wire wheel; a simulated cap to be mounted to said hub element; and a bolt extending through an opening in said existing cap having a thread portion engaged in a tapped opening of said simulated cap for clamping said annular member in a superposed relation to the rim of said wheel and securing said hub element to the existing cap of the hub of said wheel, whereby said cover is held to said wheel to simulate a wire spoked wheel.

4. A wheel cover of the type described, comprising: a body portion simulating a hub element; a plurality of wire spokes extending rearwardly and outwardly from the normally outer end of said body portion; an annular member of a diameter substantially equal to the diameter of the rim of said wheel; means for securing the free ends of said spokes to said annular member; a simulated hub cap adapted to be mounted to the normally outer end of said body portion; and means engaged with said simulated hub cap and the existing hub cap of said wheel for clamping said body portion to said existing hub cap and for holding said annular member against said rim of the wheel whereby said cover is mounted to the outer side of said wheel to simulate a wire spoked wheel.

5. A wheel cover of the type described, comprising: a body portion including a frusto-conical shell terminating in a cylindrical shell simulating a hub element; a plurality of wire spokes extending rearwardly and outwardly from the cylindrical shell of said body portion; an annular member of a diameter substantially equal to the diameter of the rim of said wheel; means for securing the free ends of said spokes to said annular member; a simulated hub cap telescopically mounted to the free end of the cylindrical shell of said body portion; and tension-producing means engaged with said simulated hub cap and the existing hub cap of said wheel for drawing said simulated hub cap into clamping engagement with said body portion to mount the same to said existing hub cap and for holding said annular member against said rim of the wheel, whereby said cover is mounted to the outer side of said wheel to simulate a wire spoked wheel.

6. A wheel cover of the type described comprising: a body portion simulating a hub element and including an enlarged terminal portion adapted to be engaged with the existing hub cap of said wheel, the opposite terminal portion being cylindrical in form to simulate a hub; a plurality of wire spokes extending rearwardly and outwardly from the outer terminal portion of said body portion; an annular member of a diameter substantially equal to the diameter of the rim of said wheel; means for securing the free ends of said spokes to said annular member; a simulated hub cap including an internal cylindrical wall to be telescopically mounted to said simulated hub of said body portion; and tension producing means engaged with said simulated hub cap and the existing hub cap of said wheel for clamping said body portion to said existing hub cap and for holding said annular member against said rim of the wheel whereby said cover is mounted to the outer side of said wheel to simulate a wire spoked wheel, said tension producing means including an elongate stud passed through an opening in said existing hub cap and having a thread portion engaged in a tapped opening formed in said simulated cap.

References Cited in the file of this patent

FOREIGN PATENTS

| Number | Country | Date |
| --- | --- | --- |
| 714,587 | France | Sept. 7, 1931 |
| 769,819 | France | Sept. 3, 1934 |